US 6,553,025 B1

(12) United States Patent
Kung et al.

(10) Patent No.: US 6,553,025 B1
(45) Date of Patent: Apr. 22, 2003

(54) MULTIPLE ROUTING AND AUTOMATIC NETWORK DETECTION OF A MONITORED CALL FROM AN INTERCEPTED TARGETED IP PHONE TO MULTIPLE MONITORING LOCATIONS

(75) Inventors: Fen-Chung Kung, Bridgewater, NJ (US); Jesse Eugene Russell, Piscataway, NJ (US); Anish Sankalia, Iselin, NJ (US); Spencer C. Wang, Parsippany, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/376,783

(22) Filed: Aug. 18, 1999

(51) Int. Cl.[7] ............................................. H04L 12/66
(52) U.S. Cl. ...................................... 370/352; 370/351
(58) Field of Search ................................ 370/351–358, 370/494, 495, 496, 389, 386, 384, 377, 373, 410

(56) References Cited

U.S. PATENT DOCUMENTS

| | | | |
|---|---|---|---|
| 5,590,171 A | | 12/1996 | Howe et al. |
| 5,943,393 A | | 8/1999 | Howell et al. |
| 6,028,914 A | * | 2/2000 | Lin et al. ..................... 379/14 |
| 6,078,648 A | * | 6/2000 | Albers et al. ................ 379/35 |
| 6,097,798 A | | 8/2000 | Albers et al. |
| 6,115,393 A | | 9/2000 | Engel et al. |
| 6,229,887 B1 | * | 5/2001 | Albers et al. ............... 379/219 |
| 6,233,313 B1 | | 5/2001 | Farris et al. |
| 6,289,025 B1 | | 9/2001 | Pang et al. |
| 6,415,027 B1 | * | 7/2002 | Malik ..................... 279/221.01 |

* cited by examiner

*Primary Examiner*—Wellington Chin
*Assistant Examiner*—Brenda Pham
(74) *Attorney, Agent, or Firm*—Alfred G. Steinmetz

(57) ABSTRACT

Monitored calls are intercepted and rerouted to plural selected monitoring stations by intervention of an IP phone monitor center (IPMC) which duplicates the voice to a monitoring location and automatically identifying the types of networks to be traversed and adapting the voice message to such a network type to communication with monitoring stations connected to these networks. Surveillance is, therefor, enabled to be conducted at more than one monitoring location each of which many are widely separated from the other. In a particular embodiment an authorized surveillance agent transmits a valid request to an IP phone monitor center (IPMC) which in response intercepts voice packets to and from the targeted IP phone. The duplicated voice packets are transmitted to the designated monitoring location. The IPMC determines the type of voice signal to be transmitted to the terminal monitoring station. If the monitoring location is serviced by an IP telephony network the monitored traffic is duplicated by the IP-AMCP in IP format to an IP DN as programmed by the IP-PIL. If the monitoring location is serviced by a PSTN network a PSTN check point (PSTN-CP) establishes a trunk connection with the local directory service (LDS) and receives incoming voice packets at the IP-AMCP which the PSTN-CP converts to voice trunk (i.e., T1) to communicate with the LDS.

9 Claims, 2 Drawing Sheets

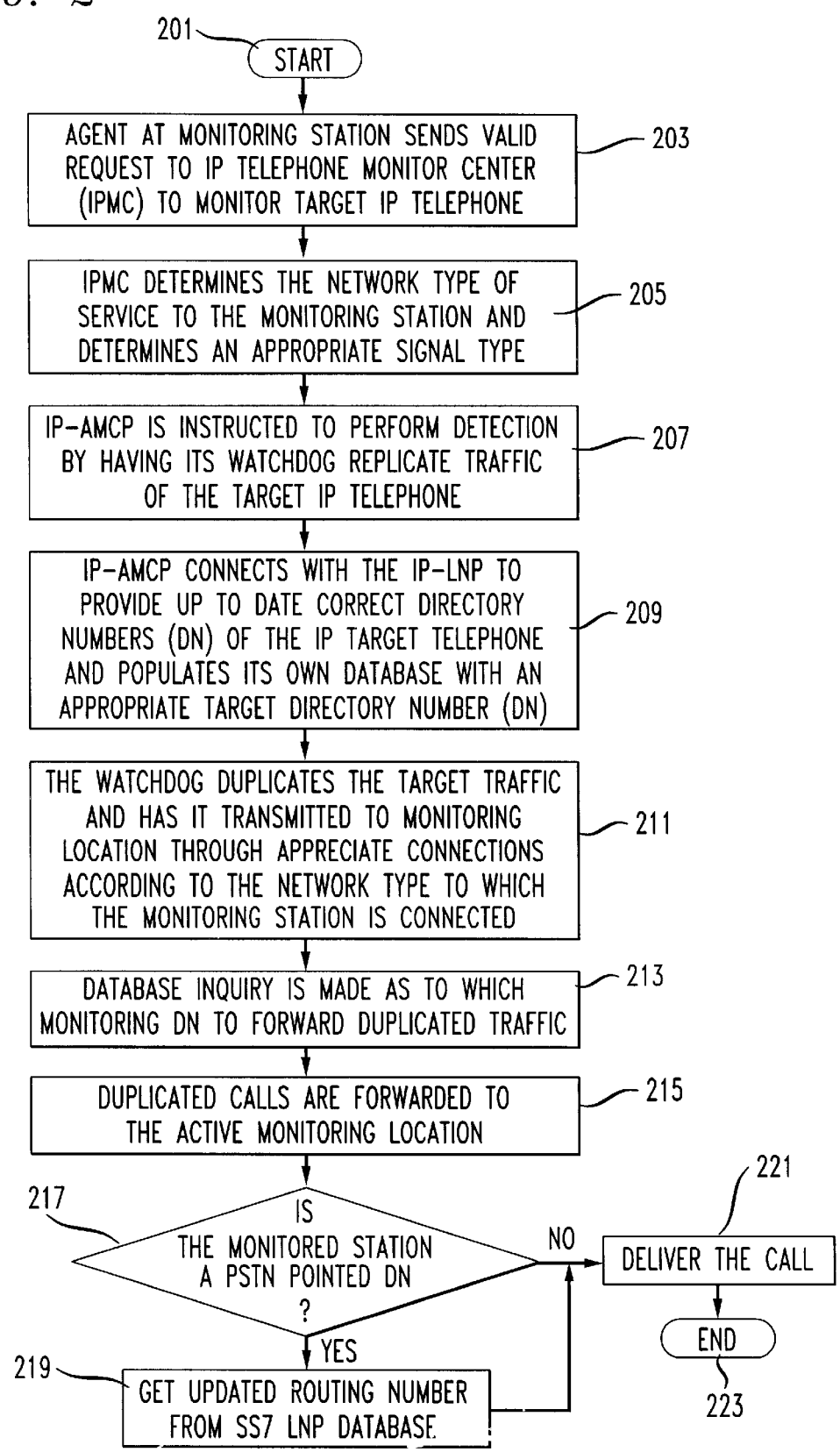

MULTIPLE ROUTING AND AUTOMATIC NETWORK DETECTION OF A MONITORED CALL FROM AN INTERCEPTED TARGETED IP PHONE TO MULTIPLE MONITORING LOCATIONS

FIELD OF THE INVENTION

This invention relates to surveillance and monitoring of telephone calls over a public communications link and is particularly concerned with providing assistance for such surveillance and monitoring to law enforcement agencies. It particularly concerns surveillance of voice over IP (i.e., cable) networks for both IP-to-IP and off net (IP-PSTN) telephone calls.

BACKGROUND OF THE INVENTION

Requirements for enabling surveillance of electronic communications have been enacted into public law (e.g., Public Law 103-414 enacted Oct. 25, 1994; CALEA Communications Assistance for Law Enforcement Act) reciting requirements for assuring law enforcement access to electronic communications. Such access is required to be in real time, have full time monitoring capabilities, simultaneous intercepts, and feature service descriptions. The requirements specifically include capacity requirements and function capability. It is incumbent upon communication carriers to provide such capability and capacity.

While initially limited in scope, at present, to certain communications technology it is almost assured that it will be extended to new technologies of communications.

With present technology surveillance and monitoring is limited to one monitoring location whose location may be static. It would be desirable to permit monitoring of multiple subscriber locations by more than one monitoring location and to permit dynamic changes to such locations and to subscriber data.

SUMMARY OF THE INVENTION

Monitored voice calls, of a targeted monitored IP subscriber are intercepted and rerouted to selected multiple monitoring stations connected to a available intervening communication networks each using different transmission technologies (e.g., PSTN networks, Packet cable telephony networks, etc.), in accord with the principles of the invention, by intervention of an IP Address-Mapping checkpoint (IP-AMCP) which duplicates the voice to a monitoring location and automatically identifying the types of networks to be traversed and adapting the voice message to such a network type to communication with monitoring stations connected to these networks. Surveillance is, therefor, enabled to be conducted at more than one monitoring location each of which many are widely separated from the other. According to the invention, selected monitoring stations connected to different type communication networks are all enabled to be connected to monitor the designated monitored target IP subscriber.

In a particular illustrative embodiment an authorized surveillance agent transmits a valid request to an IP-AMCP which in response intercepts voice packets to and from the targeted IP phone. The monitored IP phone directory number (DN) is logged in the IP Phone Intercept List (IP-PIL) database at the IP-AMCP location. When a call is made to/from the monitored IP phone and detected by the Watch-Dog program using the IP-PIL database at the IP-AMCP, the duplicated voice packets are transmitted to the designated monitoring location. The IP-AMCP determines the type of voice signal to be transmitted to the terminal monitoring station. The IP-PIL contains information for the network types servicing the monitoring locations. If the monitoring location is serviced by an IP telephony network the monitored traffic is duplicated by the IP-AMCP in IP format to an IP DN as programmed by the IP-PIL. If the monitoring location is serviced by a PSTN network a PSTN check point (PSTN-CP) establishes a trunk connection with the Local Digital Switch (LDS) and receives incoming voice packets from the IP-AMCP which the PSTN-CP converts to voice trunk (i.e., T1) to communicate with the LDS.

While the terminal monitoring station is a ported DN, the IP-AMCP generates a query to the corresponding Local Number Portability (LNP) database. This database is particularly concerned with transferring processes to accommodate changes of systems. It normally resides in an SS7 network or its equivalent. In particular, if the monitoring location is in the IP telephony, the IP-AMCP requests an updated routing number from the IP-LNP database. For a PSTN monitoring location, the PSTN-CP requests an updated routing number from the SS7 LNP database.

BRIEF DESCRIPTION OF THE DRAWING

FIG. 2 is a flow process of the process of rerouting calls in the communications system of FIG. 1.

DETAILED DESCRIPTION

Figure 1:
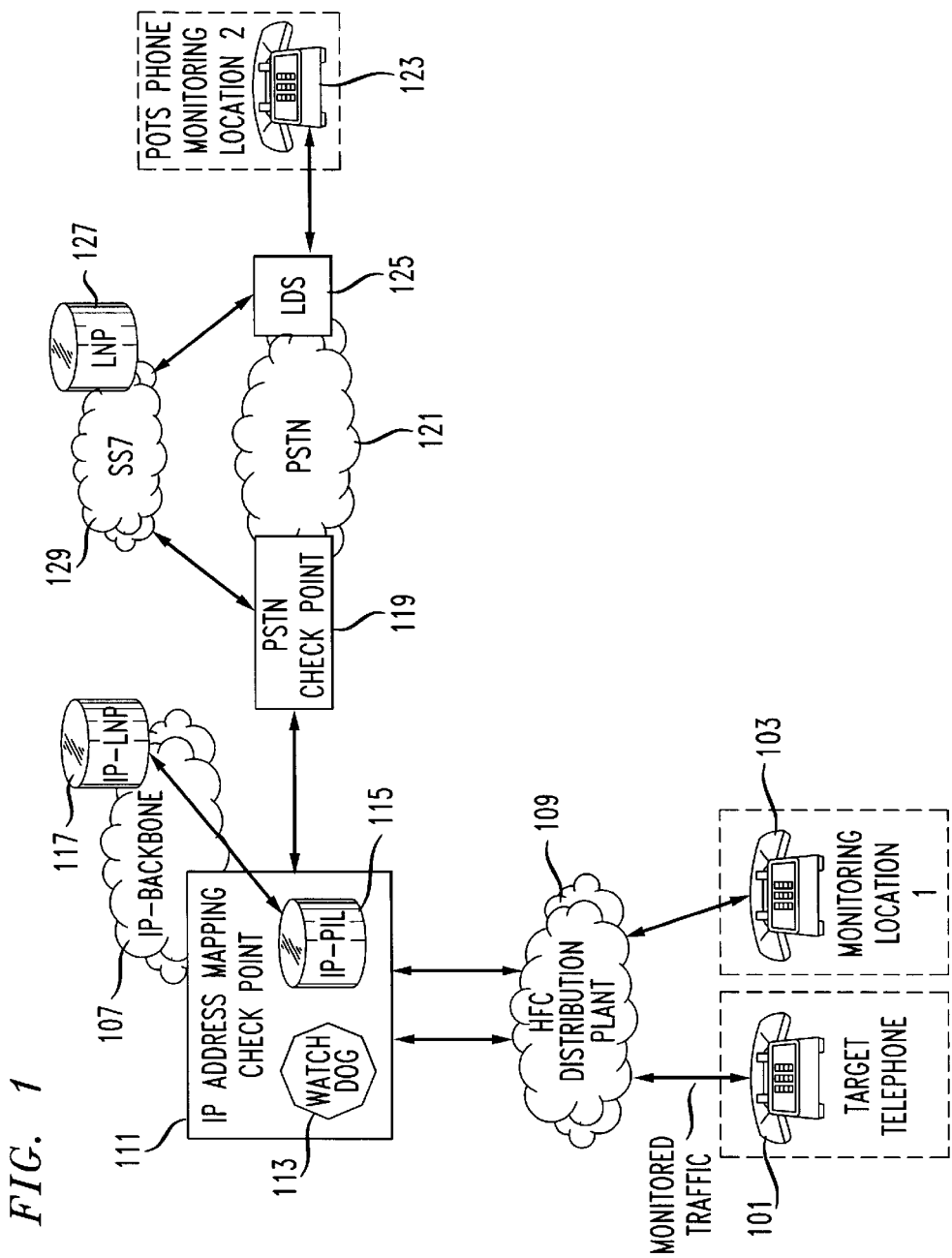
FIG. 1 is a block schematic of a communications system with multiple monitoring locations and rerouting of intercepted calls to the locations.

A monitoring arrangement in which a target IP phone station connected to an IP backbone communication network, which may be monitored by an EP monitoring station connected to the IP backbone or by a POTS monitoring station connected to a PSTN communications network, is shown in block schematic form in the FIG. 1. A target IP telephone 101 and an IP monitoring station 103 are both shown connected to an IP backbone communication network 107 via a Hybrid Fiber Coax (HFC) distribution plant 109, which is an outside plant distribution cabling arrangement utilizing both fiber optic and coaxial cable. The fiber optics are connected to the backbone and are also connected to the phone station via coaxial cable. Optic electric conversion connects the cable to the fiber. It provides broadband services and telephony services. It also advantageously utilizes existing embedded cable networks.

The IP backbone network includes an IP-Addressing Mapping Check Point (IP-AMCP) 111 which through its WatchDog device or software 113 detects and intercepts IP voice activity of the target IP phone station 101 to be monitored and duplicates its voice packets. The IP-AMCP may be embodied in a server within or connected to the network. It has the capability, through programming, of examining packet contents and authenticating users of the network. With specific WatchDog software the IP-AMCP identifies activity of specific activity from designated telephone stations at a specified DN or IP address and can replicate/duplicate the packets of that phone which replicated/duplicated packets may be forwarded to a monitoring station. The IP-AMCP also populates the data base of the IP Phone Intercept List (IP-PIL) 115, a database of IP phones Directory Numbers (DNs) presently selected for surveillance. Included with the backbone network is an IP Local Number Portability (IP-LNP) database 117, which allows a station to move to a new location or DN while retaining the same DN for surveillance purposes.

A second monitoring station 123, which in the illustrative embodiment is shown comprising a Plain Old Telephone Service (POTS) device serviced by a Public Switched Telephone Network (PSTN) system 121. This PSTN is connected to a PSTN Check Point (PSTN-CP) 119, which in turn connects it to the IP-AMCP 111. PSTN Check Point 119 establishes a trunk connection with a Local Digital Switch 125 at which the POTS device is connected to the PSTN 121 and converts the received voice packets of the monitored targeted IP phone to voice trunk for delivery through the PSTN 121 to the POTS phone 123. PSTN-CP 119 also provides a connection to the Local Number Portability Database (LNP) 127 for the PSTN through the SS7 network 129 allowing the monitoring POTS telephone 123 to receive routed duplicated voice packet if the DN for the telephone is ported.

The method in which the network is operated in performing surveillance is schematically shown in the flow chart of FIG. 2. The process starts at terminal 201 and in block 203 the process responds to a valid request, addressed to an IP Phone Monitor center (IP PMC), from an agent at a monitoring station. The contacted IP PMC determines the network type connecting the monitoring station and determines the appropriate signal type involved. It provides instructions, as per block 207, to the IP-AMCP of the terminating network to through its WatchDog program replicate the traffic of the target IP telephone to be monitored.

As per block 209 the IP-AMCP connects to the IP-Local Number Portability (IP-LNP) to provide an up to date Directory Number (DN) of the IP target telephone and also updates its own database with appropriate DNs. According to instructions of block 211 the replicated traffic of the target IP telephone is transmitted to monitoring locations being adapted by WatchDog of each intervening network to conform to the network technology. In block 213 a database inquiry determines which monitoring station(s) to forward the replicated traffic. This duplicated traffic, according to block 215, is forwarded to identify active monitoring stations.

An inquiry in decision block 217 determines if the monitored station is at a ported DN. If such is the case (i.e., yes) the new routing number is obtained from the SS7 LNP database as per block 219 and as per block 221 the call is delivered to that DN. If not (i.e., no) the instructions of block 219 are not utilized and the process goes directly to block 221 having the call delivered.

At the end of a session the process ends in terminus 223. The following applications are being filed concurrently with the present application and are incorporated herein by reference. All applications have the same inventors (e.g., Kung, Russell, Sankalia and Wang).

U.S. patent application Ser. No. 09/375,754, filed Aug. 18, 1999, entitled Monitoring Selected IP Voice Calls Through Activity of a WatchDog Program at an IP-Addressing Mapping Check Point;

U.S. patent application Ser. No. 09/375,750, filed Aug. 18, 1999, entitled Monitoring IP Voice Calls Under Command of a PSTN Phone;

U.S. patent application Ser. No. 09/376,782, filed Aug. 18, 1999, entitled Flexible Packet Technique for Monitoring Calls Spanning Different Backbone Networks;

U.S. patent application Ser. No. 09/376,459, filed Aug. 18, 1999, entitled Secure Detection of an Intercepted Targeted IP Phone from Multiple Monitoring Locations;

U.S. patent application Ser. No. 09/376,462, filed Aug. 18, 1999, entitled Automatic IP Directory Number Masking and Dynamic Packet Routing for IP Phone Surveillance;

U.S. patent application Ser. No. 09/376,454, filed Aug. 18, 1999, entitled IP Voice Call Surveillance Through use of Non-dedicated IP Phone with Signal Alert Provided to Indicate Content of Incoming Call Prior to an Answer as Being a Monitored Call.

While exemplary systems and methods embodying the present inventions are shown by way of example, it will be understood, of course, that the invention is not limited to these embodiments. Modifications may be made by those skilled in the art which differ from the specific details disclosed here, but which are still within the scope of the invention. Further elements of one invention may be readily included as elements of one of the other inventions. Those skilled in the art may combine or distribute the elements in many different ways without departing from the spirit and scope of the invention.

What is claimed is:

1. A surveillance and monitoring system providing monitoring of IP voice calls at a plurality of monitoring stations at different locations connected to networks of different transmission technologies, comprising:

an IP Address Mapping Check Point (IP-AMCP) for translating address formats allowing different protocols of different networks to interoperate and for intercepting voice packets from a designated target IP phone number;

an IP Phone Intercept List (IP-PIL) database connected to the IP-AMCP and including a phone Directory Number (DN) of a phone to be monitored;

a first monitoring station connected to a first technology network and connected through the first technology network for transmitting a surveillance request to the IP-AMCP via the IP-PIL;

a second monitoring station connected through a second technology network to the IP-AMCP and the IP-PIL;

a target IP telephone whose traffic is to be monitored connected to the IP-PIL and the IP-AMCP; and the local number portability (LNP) database for providing DNs of monitoring stations for connecting a monitoring station to the designated IP phone number in response to duplicated call packets of the targeted monitored IP phone number.

2. The surveillance and monitoring system of claim 1 wherein the IP-AMCP includes:

a WatchDog program for detecting traffic activity of the monitored IP phone.

3. The surveillance and monitoring system of claim 2 wherein the WatchDog program interacts with the IP-PIL database for identifying IP phones scheduled for monitoring.

4. The surveillance and monitoring system of claim 3 wherein the IP-PIL includes information concerning the network types to which the monitoring stations are connected and transmits said information on network types to the IP-AMCP which determines the type of voice signal to be transmitted to the monitoring stations.

5. The surveillance and monitoring system of claim 1 wherein the IP-LNP is connected to identify system connectivity of monitored IP phone stations calls to the monitoring stations connected to an IP network.

6. The surveillance and monitoring system of claim 1 wherein a PSTN (Public Switched Telephone Network) is connected to query a PSTN Local Number portability (LNP) database for delivering monitored calls to the monitoring station if the stations DN is a ported number.

7. A method of multiple routing of a monitored call to multiple monitoring stations, comprising the steps of:

submitting a request from a field location to an IP Address Mapping Check Point (IP-AMCP) to monitor a call of a target IP telephone station proximate to the first monitoring station;

intercepting the voice packets of the target IP telephone station via an IP Phone Intercept List (IP-PIL) database query and duplicating the voice packets intercepted;

determining the network type of the designated monitoring locations; connecting the IP-AMCP to a number portability database for updating the routing information for transmission to the ported monitoring locations; and determining if the selected monitoring location is serviced by an IP telephone network backbone and forwarding the duplicated voice packets to the destination monitor station.

8. The method of claim 7 wherein the step of connecting includes:

connecting the IP-AMCP to an IP Local Number Portability (IP-LNP) database, via an IP backbone network for IP monitoring stations connected to the IP backbone network.

9. The method of claim 7 wherein the step of connecting includes:

connecting IP-AMCP via a PSTN Check Point and a Signaling System 7 Check Point (SS7-CP) to a Local Number Portability (LNP) database, via a PSTN backbone network for POTS monitoring stations connected to the PSTN backbone network.

* * * * *